United States Patent [19]

Hanley

[11] 3,734,566
[45] May 22, 1973

[54] RACING VEHICLE WHEEL HAVING IMPROVED COOLING STRUCTURE

[75] Inventor: Donald E. Hanley, Butte, Mont.

[73] Assignee: Red Devil Engineering, Inc., Butte, Mont.

[22] Filed: Apr. 9, 1971

[21] Appl. No.: 132,780

[52] U.S. Cl. .................................301/6 CS, 301/63 R
[51] Int. Cl. ..............................................B60b 19/10
[58] Field of Search ....................................301/6 CS; 188/264 AA, 264 A, 264 W

[56] References Cited

UNITED STATES PATENTS

| D103,682 | 3/1937 | Kerr | 301/6 CS |
| 2,022,153 | 11/1935 | Rogers | 301/13 SM |
| 2,237,164 | 4/1941 | Rosenberg | 301/6 CS |
| 2,754,939 | 7/1956 | Hibbard | 301/6 CS |
| 3,051,271 | 8/1962 | Spannagel | 301/6 CS |

Primary Examiner—Richard J. Johnson
Attorney—C. Michael Zimmerman

[57] ABSTRACT

A wheel especially designed for racing vehicles is described which has an improved structure for cooling both the wheel and any brake or vehicle structure behind the wheel. The wheel includes a circular frame for supporting a ground engaging tire and adapted for securance to the wheel hub or axle of a racing vehicle. A circular array of apertures extends through the side face of the frame adjacent the rim thereof upon which the tire is to be mounted. A fin is associated with each of the apertures and extends outwardly from the side face at a location and in an orientation with respect thereto at which the fin will intercept air flow by the face as the wheel turns and divert such air flow through the aperture.

4 Claims, 5 Drawing Figures

PATENTED MAY 22 1973 3,734,566

INVENTOR.
Donald E. Hanley
BY
C. Michael Zimmerman
ATTORNEY

RACING VEHICLE WHEEL HAVING IMPROVED COOLING STRUCTURE

BACKGROUND OF THE INVENTION

The present invention relates to a wheel for a racing vehicle, such as a racing go-cart, stock car or formula car, and, more particularly, to such a wheel which provides improved cooling of both the tire mounted on the wheel and any brake or other vehicle structure behind the wheel.

Because of the speeds involved in automobile and go-cart racing, relatively large amounts of heat are generated in the tires of the racing vehicles. This heat can be detrimental to the tires and the safe operation of the vehicles. In the case of racing vehicles utilizing pneumatic rubber tires, for example, the amount of tire wear caused during a race is directly proportional to the temperature at which the tire runs during the race. Moreover, excessive tire heat results in weakening of the tire walls during a race and can cause tire blow out. It will be appreciated that a blow out in a racing situation can be quite serious.

Hard and continual braking of a vehicle in a race is also required. As is known, such action causes substantial heat to be generated in the braking mechanism, which heat deleteriously affects the braking action. For example, heat generated by the friction in disc brake mechanisms often results in fading and reduced stopping power. This partial or whole braking failure not only affects a driver's chances of being successful in a race, but also can be the cause of serious accidents.

Various wheels and other mechanisms have been designed in the past to alleviate the above heating problem. For example, wheels for most racing vehicles are now designed with apertures extending through the side faces thereof so that air circulation around the wheel is permitted. Brakes have also been provided with special materials purportedly good in either dissipating heat or in withstanding high heat in attempts to correct the problems associated with hard braking. However, the steps which have been taken to date have not satisfactorily provided the full heat dissipation or resistance needed.

SUMMARY OF THE INVENTION

The present invention is a wheel for a racing vehicle which includes cooling structure capable of not only providing enhanced cooling of the wheel itself but also of the vehicle brake mechanism or other structure which is normally shielded by the wheel. In its basic aspects, the wheel includes, as is usual, a circular frame for supporting a ground engaging tire and which is adapted for securance to a wheel hub or axle of a racing vehicle. One or more apertures are provided extending through the side face of the circular frame for the flow through the wheel of cooling air as the wheel rotates. As a particularly salient feature of the instant invention, it includes in combination with each of the apertures a fin extending outwardly of the side face of the wheel at a location and in an orientation with respect to the frame at which the fin intercepts air flow by the wheel as it rotates and diverts such air flow through its associated aperture. The provision of the fin in this manner causes a pressurized air flow through the apertures and, hence, substantially increases the conduction of heat from the wheel and any structure behind it. The fins also act as extended surfaces for the radiation of heat from the wheel. In this connection, the radiation is greatly enhanced by conduction directly from the fins since such fins project outwardly into the stream of air flow adjacent the wheel.

It has been found that the provision of the fins in combination with the apertures through the side face of the frame markedly enhances the rate at which heat is conducted from both the tire and brake structure behind the wheel. The result has been greater safety on the racing track as well as better braking control for success.

Most desirably, the fins and associated apertures are provided around the exterior periphery of the side face adjacent the outer rim upon which the ground engaging tire is mounted. Such radially outward location of the apertures and fins assures that the same are subjected to the greatest radial velocity through the air for interaction with the greatest amount of air practical for diversion through the apertures. The location of the apertures adjacent the rim upon which the tire is mounted also places them close to the location at which the heat is being generated and from which it must be dissipated.

The wheel of the invention includes other features and advantages which are either described and discussed below in connection with the description of the preferred embodiment or which will become apparent to those skilled in the art from the following.

BRIEF DESCRIPTION OF THE DRAWINGS

With reference to the accompanying sheet of drawings.

DETAILED DESCRIPTION OF THE PREFERRED EMBODIMENTS

Figure 1:
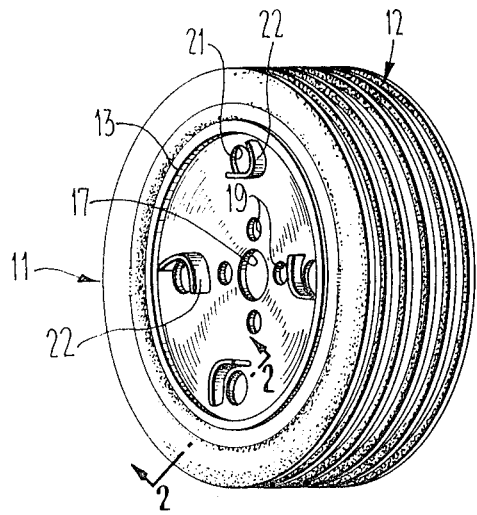
FIG. 1 is an isometric view of a preferred embodiment of the wheel of the invention having a tire mounted thereon.

With reference to the accompanying sheet of drawing, FIG. 1 illustrates a wheel, generally referred to by the reference numeral 11, incorporating the features of the present invention and on which is mounted a pneumatic or other type of tire 12. Wheel 11 is designed for a racing vehicle such as a racing go-cart or formula car and, as is conventional, is in the form of a circular frame 13 of a lightweight metal or, for some purposes, a plastic, for supporting the tire 12. In this connection, the circular frame has an outer, generally cylindrical rim 14 (FIG. 2) upon which the tire is mounted. A circular flange 16 is provided around both side edges of the rim in order to retain the tire thereon.

Means are also provided for securing the wheel to an axle or wheel hub of a racing vehicle for axial rotation. For this purpose, a central aperture 17 is provided through a concavely dished, inner plate 13 for receiving a wheel hub of the vehicle. Moreover, a circular array 19 of apertures are provided axially surrounding aperture 17 for receiving lug nuts or bolts. While for exemplary purposes the means shown for securing the wheel to a racing vehicle are specific, it will be appreciated that in each instance the particular securing means used will be dependent upon the type of vehicle for which the wheel is designed, and various types of securing arrangements are equally applicable to the invention.

The wheel inner plate 18 defines the exterior side face of such wheel and includes a plurality of spaced apertures 21 extending therethrough. Apertures of this nature are often provided through the side faces of racing wheels in order to reduce the amount of material present in the wheel and, hence, make it more lightweight. Such apertures are also provided to enable the circulation of air around and through the wheel and to any braking mechanism therebehind. However, in the instant invention such apertures cooperate with additional structure to provide enhanced cooling of both the wheel and such braking mechanism. More particularly, a fin 22 associated with each aperture 21 extends outwardly of the side face at a location and in an orientation with respect to the frame 11 at which upon axial rotation of the wheel, the fin intercepts air flow by the plate 18 and diverts such air flow through the aperture. More specifically, each of the fins 22 is located rearwardly of its associated aperture 21 adjacent the periphery thereof and extends outwardly of the side face therefrom. When it is stated herein and in the claims that the fins are "rearwardly" of their associated apertures, it is meant that each of the fins is located at a position at which it follows its associated aperture upon angular rotation of the wheel in the direction causing forward motion of the racing vehicle to which the wheel is secured. In this connection, it should be noted that wheels on opposite sides of a vehicle rotate in opposite directions relative to the wheel exterior side configuration, and the fins must be correspondingly provided on different sides of the apertures depending on the side of a vehicle for which a wheel is intended.

Most desirably, each of the fins is curved as shown along the side face to generally conform to the rear periphery of its associated aperture. This positions all portions of each fin closely adjacent to the periphery of its aperture and assures that the full fin cooperates with the aperture. It also aids in the functioning of the fin as will be described. For simplicity in construction, the apertures can be provided with a circular periphery as shown and each of the fins can be curved arcuately along the side face to conform with such circular periphery It will be appreciated from the above that the fins 22 extend into the air stream by the side face of the wheel as the wheel rotates on a racing vehicle. Absent the fins of the combination, this air is generally turbulent due to the passage of the wheel and racing vehicle therethrough, and has no definite directional component which is especially useful from the standpoint of cooling the wheel. However, in the present invention, the fins intercept the air adjacent the side face of the wheel and utilize it to enhance the cooling. That is, the air intercepted by the forward side of each fin, i.e., the side adjacent the aperture, will be compressed as the wheel continues to rotate and diverted by the fin through the aperture. The compression of the air provides a greater density thereof to increase its thermal capacity, and the diversion of the air through the aperture provides it with a directional component resulting in cooling of the wheel. Because each fin is curved arcuately, it presents a concave face to the air which not only enhances the air compression caused by it but also inhibits flow or escape of the air around the ends of the fin instead of through the aperture.

In the embodiment illustrated, the fins extend outwardly from the plate 18 to the plane of the rim 16. The particular location of the free edge of the fins thus provided is not limiting. It will be appreciated that the fins could either extend outwardly of the wheel further than the rim or could be shorter as is desired or required for particular cooling applications or race regulations.

More desirably, the aperture and fins are arranged as is illustrated in a circular array closely adjacent the outer periphery of the plate 18 and, hence, adjacent the inner surface of the rim 14 upon which the tire is to be mounted. The positioning of the aperture-fin combinations at such location spaces the same radially as far as practical from the center of rotation or the wheel. The result is that upon rotation of the wheel the tangential velocity through the air of each fin-aperture combination is as high as practical, thereby optimizing the amount of air being intercepted, compressed and diverted through the apertures 21. It also results in the fin-aperture combinations being closely adjacent the location at which the wheel is mounted and at which heat is generated. The wheel is therefore cooled at the most appropriate location for efficient cooling.

The tire supporting rim of most wheels designed for pneumatic tires is stepped radially inward of the wheel adjacent the inner side of the plate 18. This radial step is represented at 23 in the drawing, and it will be noted that such step extends inwardly for a distance sufficient to place the stepped portion in the path of air, represented by the arrows 24, through the aperture 21. The resulting direct impingement of air on the rim enhances the transfer of heat from the rim to such air. In this connection, it will also be noted that because of the dished shape of the plate 18, the side face of the wheel defined thereby forms an acute interior angle with the outer rim at the location at which the apertures 21 extend therethrough. Because of the resulting orientation of the aperture with respect to the rim 14, air flow therethrough has a directional component which extends radially outward of the wheel for impingement on the inner surface of the rim. This particular orientation of the apertures with respect to the rim is therefore also advantageous in assuring good heat transfer characteristics between the rim and the air.

It should be noted that the aperture 21 is sufficiently long in the radial direction of the wheel that a portion of the air flowing therethrough either does not impinge on the rim or is deflected thereby for subsequent impingement on the brake or other structure of the vehicle behind the wheel. As has been brought out previously, substantial heat is generated by the brakes during the hard braking one finds in races, which heat detrimentally affects the braking operation. The invention therefore provides enhanced cooling of this mechanism as well as of the wheel as earlier described.

Figure 2:
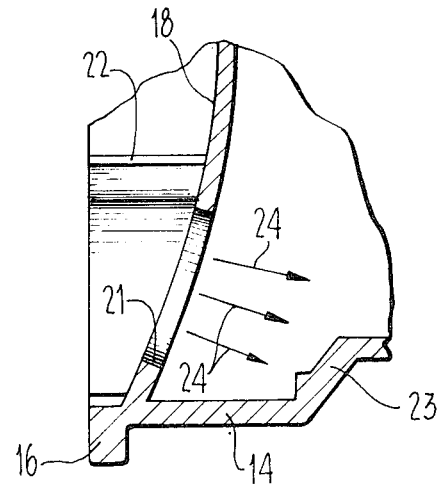
FIG. 2 is an enlarged, partial sectional view of the embodiment of FIG. 1 taken on a plane indicated by the lines 2—2 in FIG. 1 and illustrating one aperture-fin combination in detail.
Figure 3:
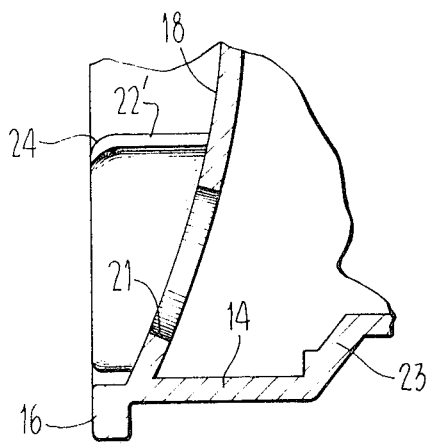
FIG. 3 is another enlarged, partial sectional view similar to FIG. 2 of another preferred embodiment of the invention.
Figure 4:
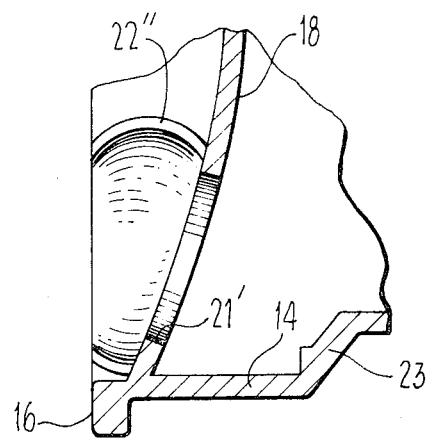
FIG. 4 is a third enlarged partial sectional view illustrating still another preferred embodiment of the invention.
Figure 5:
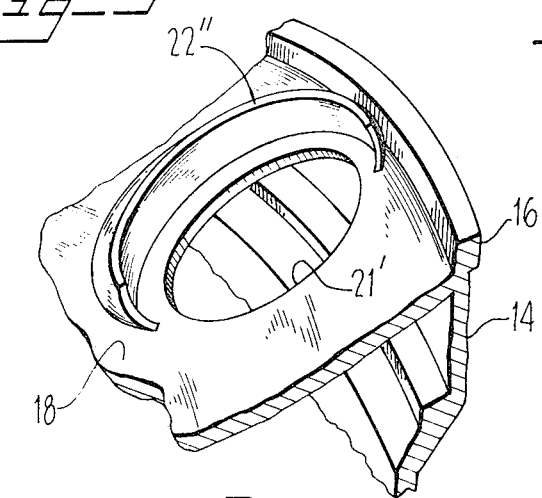
FIG. 5 is an enlarged, partial perspective view of the embodiment of FIG. 4 illustrating the configuration and relationship of an aperture and fin thereof.

In some situations, such as when relatively low racing speeds are involved but yet large amounts of heat might be generated in either the tire or the braking mechanisms, it is desirable to provide a greater cooling effect than that provided by the straight-forward fin-aperture combination of the embodiment illustrated in FIGS. 1 and 2. FIGS. 3–5 show two alternate embodiments of the invention especially designed to provide such greater cooling. More particularly, first with respect to FIG. 3, it will be seen that the free edge of the fin 22' shown therein, i.e., the edge of the fin opposite that edge joining the side face 18, is curved inwardly along its length toward its associated aperture. The provision of the resulting inwardly curved lip 24 at the free edge of the fin will provide a greater capture and condensation of air than that provided by the fin previously described in which air can escape by the edge. It will also direct the air flow preferentially through the aperture 21 to enhance the cooling. And while the provision of the lip may be somewhat complicated from the manufacturing standpoint, the greater cooling provided by the same more than offsets its added expense in some situations.

The embodiment of the invention illustrated in FIGS. 4 and 5 has several features enhancing the cooling ability provided by it. Each of the fins 22'' of this embodiment is generally concavely shaped, i.e., presents a concave face to oncoming air, rearwardly of its associated aperture. The fin thus acts as an air scoop which enhances the capture of air and consequent condensation thereof for diversion through its associated aperture. Each of the apertures 22'' is also oval shaped with its major axis extending generally along a radius of the wheel. The apertures are therefore elongated toward the center of rotation of the wheel and extend therealong for a greater distance than is required for impingement of air flowing therethrough on the rim 14. This assures that a portion of the air through the aperture can flow by the rim for consequent impingement on the braking structure for enhancing the cooling thereof.

While the invention has been described in connection with several preferred embodiments thereof, it will be appreciated by those skilled in the art that many changes and variations are possible within its scope. It is therefore intended that the protection afforded applicant be limited only by the claims and their equivalents.

I claim:

1. A wheel for a racing vehicle or the like comprising a circular frame for supporting a ground engaging tire and adapted for securance to a wheel hub or axle of a racing vehicle for axial rotation, a plurality of apertures extending through a side face of said frame at spaced locations adjacent the frame outer rim upon which a ground engaging tire is to be mounted, and a plurality of fins extending outwardly of said side face with each of said fins being associated with a corresponding one of said apertures at a location and in an orientation with respect to said frame at which upon axial rotation of said wheel said fin intercepts air flow by said face and diverts said air flow through its associated aperture, said rim being stepped radially inward or said wheel adjacent the side of said face opposite said fin for a distance placing said stepped portion in the path of air flow through said plurality of apertures whereby air caused to flow through said apertures will impinge directly on said stepped portion for enhanced transfer of heat therefrom.

2. The wheel for a racing vehicle or the like of claim 1 wherein each of said apertures has a circular periphery and each of said fins is curved arcuately along said side face to conform with the circular periphery of its associated aperture.

3. The wheel for a racing vehicle or the like according to claim 1 wherein said side face of said wheel forms an acute interior angle with said outer rim at the locations at which said apertures extend therethrough whereby air flow through said apertures has a directional component radially outward of said wheel for impingement thereof on the inner circumferential surface of said rim.

4. The wheel for a racing vehicle or the like of claim 3 wherein, each of said apertures extends radially along said side face toward the center of rotation of said wheel for a greater distance than does said stepped portion so that at least a portion of the air flow therethrough flows by said stepped portion for impingement on brake structure or the like positioned behind said wheel on a racing vehicle to which said wheel is secured.

* * * * *